US006941340B2

(12) United States Patent
Kim et al.

(10) Patent No.: US 6,941,340 B2
(45) Date of Patent: Sep. 6, 2005

(54) METHOD AND APPARATUS FOR CONTROLLING AT LEAST ONE CONTROLLED DEVICE IN A CONTROLLING DEVICE

(75) Inventors: Do-hyoung Kim, Suwon (KR); Jong-wook Park, Suwon (KR); Ju-ha Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 786 days.

(21) Appl. No.: 09/793,735

(22) Filed: Feb. 27, 2001

(65) Prior Publication Data

US 2002/0046403 A1 Apr. 18, 2002

(30) Foreign Application Priority Data

Aug. 23, 2000 (KR) ........................................ 2000-48985

(51) Int. Cl.[7] .............................................. G06F 15/16
(52) U.S. Cl. ...................................... 709/203; 709/226
(58) Field of Search ................................ 709/203, 220, 709/221, 225, 226, 229

(56) References Cited

U.S. PATENT DOCUMENTS

| | | | |
|---|---|---|---|
| 5,961,594 A | | 10/1999 | Bouvier et al. |
| 6,509,913 B2 | * | 1/2003 | Martin et al. ................ 345/762 |
| 6,581,094 B1 | * | 6/2003 | Gao ............................ 709/220 |
| 6,732,197 B1 | * | 5/2004 | Overy ............................ 710/8 |
| 6,751,648 B2 | * | 6/2004 | Kakimoto et al. .......... 709/203 |

FOREIGN PATENT DOCUMENTS

| | | |
|---|---|---|
| CN | 1226709 A | 8/1999 |
| EP | 0 955 774 A2 | 11/1999 |
| EP | 0 959 622 A2 | 11/1999 |
| JP | 09-116985 A | 5/1997 |
| JP | 09-149325 A | 6/1997 |
| JP | 09-282263 A | 10/1997 |
| JP | 09-319687 A | 12/1997 |
| JP | 10-155188 A | 6/1998 |
| JP | 10-191463 A | 7/1998 |
| JP | 10-224875 A | 8/1998 |
| JP | 10-301874 A | 11/1998 |
| JP | 11-004228 A | 1/1999 |
| JP | 11-073418 A | 3/1999 |
| JP | 11-187061 A | 7/1999 |
| JP | 11-328081 A | 11/1999 |
| JP | 11-341472 A | 12/1999 |
| JP | 2000-003347 A | 1/2000 |
| JP | 2000-010753 A | 1/2000 |
| JP | 2000-134256 A | 5/2000 |
| JP | 2000-172600 A | 6/2000 |
| WO | WO 97/18636 A2 | 5/1997 |
| WO | WO 99/59072 A2 | 11/1999 |
| WO | WO 00/13412 A | 3/2000 |
| WO | WO 00/76130 A1 | 12/2000 |

OTHER PUBLICATIONS

Keiichi Teramoto, et al; Design and Implementation of home Gateway—Integrated Control of Digital Consumer Appliances; IPSJ SIG Notes vol. 99, No. 18 Feb. 26, 1999; JAPAN.

* cited by examiner

*Primary Examiner*—Mehmet B. Geckil
(74) *Attorney, Agent, or Firm*—Sughrue Mion, PLLC

(57) ABSTRACT

A method and apparatus for controlling at least one controlled device in a controlling device, in which a target device to perform an actual controlling operation is set in the case that a device control message is transferred to a web server by a user manipulation in a controlling device under a virtual server controlling system are provided. The method includes the steps of loading a web browser screen, transferring a message including a controlled device identifier part and a control information identifier part to a web server module, and setting a target device of the at least one controlled device based on the controlled device identifier part of the message and identifying the control information based on the control information identifier part, to thereby provide the web server module with control information with respect to the set target device and the identified controlled device.

31 Claims, 5 Drawing Sheets

METHOD AND APPARATUS FOR CONTROLLING AT LEAST ONE CONTROLLED DEVICE IN A CONTROLLING DEVICE

BACKGROUND OF THE INVENTION

1. Field of the Invention

The present invention relates to a method and apparatus for controlling at least one controlled device in a controlling device, and more particularly, to a method and apparatus for controlling at least one controlled device in a controlling device, in which a target device to perform an actual controlling operation is set in the case that a device control message is transferred to a web server by a user manipulation in a controlling device under a virtual server controlling system. The present application is based on Korean Patent Application No. 00-48985, which is incorporated herein by reference.

2. Description of the Related Art

For convenience of explanation, a home network, which is constructed by an IEEE 1394 high performance serial bus that is widely used as an interface for digital equipment will be described. In a home network in which a plurality of devices have been connected using the IEEE 1394 protocol, various control commands are provided in order to control each device. Among them, an important control command is an audio/video control (AV/C) digital interface command set. The control command system defines a particular command code for every device or every function provided from each device, and sends a command code corresponding to the control content when a control device intends to perform a predetermined control with respect to a device to be controlled, to thereby transfer a command, in which command codes are being vividly defined at present.

In the case of a home network that has been constructed by the AV/C control command system, if there exists a device or function to be controlled, a new command code corresponding to the device or function would be defined. Accordingly, a problem seems to be solved simply. However, the following problems exist in view of the construction, operation and maintenance of the actual home network. First, a control device should possess a control command code set with respect to all devices to be controlled that can be connected to the control device. Thus, the control device is burdened by considerable software. Second, a control device that has been already issued from a manufacturer has no information about a forthcoming newly defined command code set. As a result, it is difficult to perform a device control smoothly with respect to a new device to be controlled.

A client/server model different from the AV/C digital interface control command system has been made as a worldwide network standard. Accordingly, there has been proposed a home wide web (HWW) with the thought that the client/server model can solve the problems of the control command system. Under the HWW control system, a control device includes a web browser 12 of FIG. 1 and operates as a client device, and a controlled device includes a web server module 26 of FIG. 1 and operates as a server device. According to the HWW control system, the controlled device includes a device control page (index.htm) for controlling itself, together with an icon image (logo.gif) and a device name (name.gif) for representing itself. The control device fetches the icon image, device name and the device control page provided from the controlled device, and displays the fetched results on a web browser screen. A user selects or clicks a desired control button on the device control page of the web browser screen, to thereby input his or her desired control content. When the user selects a predetermined control button, a message connected to the control button is transferred to the controlled device, and the controlled device judges what is the control content from the received message, to accordingly perform a predetermined operation.

FIGS. 1 and 2 illustrate a process that a digital VHS 20 is controlled on a digital TV 10 according to a conventional HWW control system in a home network system where the digital TV 10 and the digital VHS 20 are connected via an IEEE 1394 bus 30. In the HWW control system, a user loads a home network device list page on a web browser 12 of the digital TV 10 and then sees a list of devices that are currently connected on the network 40 and 50. FIG. 1 illustrates that items of the digital VHS 20 have been produced on the web browser 12. That is, in the HWW, each device includes device representation information for representing each device itself, in which case a logo.gif file is included as its icon image and a name.gif file is included as its device name image. The web browser 12 fetches the device representation information such as logo.gif and name.gif with respect to each device that exists on the IEEE 1394 bus 30 at present, and makes a device display icon 14 as shown in FIG. 1. Also, in the HWW standard, an index.htm file should be included as device control information or a device control page necessary for controlling itself in addition to the device representation information. Accordingly, the digital VHS 20 of FIG. 1 has an index.htm file. In order for a user to access the device control page, the logo.gif is linked with <A href="index.htm"></A> as shown in FIG. 1.

If a user clicks an icon 14 of the digital VHS 20 that he or she wishes to control in the home network device list page shown in FIG. 1, the device control page of the digital VHS 20 linked to the logo.gif, that is, the index.htm contained in a web server module 26 of the digital VHS 20 is displayed on the web browser 12 of the digital TV 10. FIG. 2 illustrates that the index.htm of the digital VHS 20 has been displayed on the web browser 12 of the digital TV 10, through the above processes. If a user selects a portion corresponding to a device control that he or she intends to control on the web browser 12, that is, a PLAY button 16, a message, e.g., "hww?play" connected to the button 16 is transferred to a web server module 26 of the digital VHS 20 to be controlled through a HTTP (HyperText Transport Protocol) that is a general message transfer standard, in step 60. The web server module 26 of the digital VHS 20 that is a controlled device receives the message, parses the content of the message, and transfers the parsed result to a system control module 24 in a main body 22 of the digital VHS 20 in step 70. Accordingly, a device control is performed from STOP to PLAY.

In the case that the home network control system has been constructed as described above, a control device has only to have a web browser 12 satisfying a predetermined requirement, and a controlled device has only to have its own contents such as its own representation page including the name.gif and logo.gif files and its own controlling page including the index.htm file therein. Accordingly, the structure is simple and the control device should not have to have a command set with respect to all controlled devices. Therefore, the above home network control system is being regarded as having a considerably large number of merits.

However, the above two control systems are much different in the principle hypothesis. As a result, in the case that a controlled device adopting only an AV/C command control system is connected to a control device supporting a HWW web client/server model based control system, it is impossible to perform a mutual device control, and thus the value of the client/server model based control system is limited.

The Applicant provided a virtual server control system which can provide a user interface identical to the client/server control system and control a controlled device of a command control system, as disclosed in Korean Patent Application No. 98-16143 and Korean Patent Registration No. 261112, which proposed an incorporation of the two control systems in the client/server control system.

FIGS. 3 and 4 illustrate a process of controlling a digital VHS 20 being a controlled device by a digital TV 10 being a control device via the virtual server control system. The digital VHS 20 being a controlled device adopts a control command module 28 and supports a control command system. The digital TV 10 being a control device includes a command module 28' (see FIG. 5) supporting a control command system of the digital VHS 20 together with a web browser 12 and a web server module 19. Since the virtual server control system is designed to have a user interface identical to the HWW control system, a user loads a home network device list page on the web browser 12 of the digital TV 10 at first as described above referring to FIG. 1, in order to see a list of devices connected to the current network. The digital VHS 20 being the controlled device does not support the HWW system, and thus does not provide the above logo.gif and name.gif files. The internal web server module 19 of the digital TV 10 being a control device as shown in FIG. 3 contains a pxvhs_logo.gif file and a pxvhs_name.gif file in advance, on behalf of the digital VHS 20, and provides them to the web browser 12.

FIG. 3 illustrates that the web browser 12 requests the internal web server module 19 in the digital TV 10 to transfer the pxvhs_logo.gif and pxvhs_name.gif image files as depicted as a dotted arrow 40, and receives them as depicted as a dotted arrow 50. As a result, an icon of the digital VHS 20 is formed on the web browser 12. As shown in FIG. 3, the web server module 19 of the digital TV 10 further includes a pxvhs_index.htm file. This file exists for the same purpose as that of the index.htm file present in the web server module 26 of the digital VHS 20 in the client/server control system. That is, although the pxvhs_index.htm file exists in order to control the function of the digital VHS 20, it is different in that the pxvhs_index.htm file does not exist in the digital VHS 20 being a controlled device but in the digital TV 10 being a control device. As shown, the pxvhs_index.htm file is linked to a pxvhs_logo.gif image being a logo icon 14 of the digital VHS 20.

FIG. 4 illustrates a process when a logo image (or a logo image and name image in both) 14 on the web browser 12 is selected or clicked by a user in order to control the digital VHS 20. If a user selects the logo image of the digital VHS 20, a message of "pxvhs_index.htm" linked to the logo image is transferred to the web server module 19 in the digital TV 10 as depicted as a dotted arrow 62. The web server module 19 returns the pxvhs—index.htm file to the web browser in reply to the user selection of the logo image as depicted as a dotted arrow 72. The pxvhs_index.htm file can be prepared and contained in advance in the web server module 19 of the digital TV 10, or can be produced dynamically according to a given circumstance.

FIG. 5 illustrates a process of operating a particular function of the digital VHS 20 being a controlled device when a user selects his or her desired function on the web browser 12 of the digital TV 10. For example, it is assumed that a current status of the digital VHS 20 being a controlled device is in a STOP state, and a user inserts a video tape cassette into the digital VHS 20 and replays it. In this case, since the user desires to replay the videotape cassette, he or she has only to select or click a portion corresponding to a REPLAY in a pxvhs_index.htm page indicated on the screen of the web browser 12 in the digital TV 10. As soon as the user selects the REPLAY portion, a message linked to the portion, e.g. "hww?pxvhs_play" is transferred to the web server module 19 of the digital TV 10 as depicted as a dotted arrow 11. The web server module 19 having received the message parses from the contents of the message that the user commanded a particular digital VHS 20 to perform a replay operation, and transfers a request for execution of the command content to the command module 28' as depicted as a dotted arrow 21. Usually, the process in which the web server module 19 transfers an execution request to the command module 28' is accomplished in a manner that a CGI (Common Gateway Interface) program of the web server module 19 calls an API (Application Program Interface) function provided by the command module 28', e.g. a DVHS Play() function. The command module 28' having received the request transfers a command to the command module 28 of the digital VHS 20, as depicted as a dotted arrow 31, using a command supported by the digital VHS 20 being a controlled device, for example, a control command of a playback mode with respect to a tape player sub-unit in the case of an AV/C command set. The command module 28 of the digital VHS 20 having received the command from the digital TV 10 parses the command and grasps a command content, e.g., a tape replay, to then transfer the content to a system module 25 of the digital main body 22 of the digital VHS 20 as depicted as a dotted arrow 41. Then, the system control module 25 shifts the state of the digital VHS 20 from the STOP mode to the REPLAY mode. Finally, a user desired control function has been accomplished. Then, it is desirable that a content that a replay command has been successfully completed in the digital VHS 20 is transferred starting from the command module 28 of the digital VHS 20, the command module 28' of the digital TV 10, and the web server module 19, and finally to the web browser 12 so as to be indicated on the screen of the web browser 12 of the digital TV 10.

As described above, the virtual server control system can control a controlled device by providing the same user interface as that of the client/server control system even with respect to a device unsupported by the client/server control system. Thus, it can be seen that all devices can be controlled on a single user interface, if the client/server control system is incorporated with the virtual server control system and the incorporated control system is provided in the case that the home network is constructed with the client/server control system.

However, if the virtual server control system is more deeply reviewed, a device control page of href="pxvha_index.htm" is linked to a pxvha_logo.gif image indicated on a device list page. Then, if a particular function portion of the device control page is selected, a device control message linked with the particular function portion, e.g., "hww?pxvhs_play" or "hww?pxvhs_rewind" is transferred to the internal web server module 19. Accordingly, the digital VHS 20 being a controlled device is controlled by using a predetermined command set, typically an AV/C command set, in response to the transferred device control message. Therefore, it can be seen that it is very difficult to determine a target device when a command is actually transferred in the AV/C command set finally. For example, in the case that two or more digital VHS's are connected in the current network, if a user presses an icon to thereby transfer a "hww?pxvhs_play" message to the web server module 19, it is difficult to determine which digital VHS 20 to control. This is because the web server module performs a device control absolutely relying upon a message, while a device selection is performed by a user visual judgment.

SUMMARY OF THE INVENTION

To solve the above problems of the prior art, it is an object of the present invention to provide a method of controlling at least one controlled device in a control device, by setting a target device of the at least one controlled device in the control device.

It is another object of the present invention to provide a method of controlling at least one controlled device in a control device by setting a target device of the at least one controlled device in the control device, in a home network where the control device is connected with a plurality of devices mutually connected via an IEEE 1394 bus and the control device is determined among the plurality of devices.

It is still another object of the present invention to provide a method of properly setting a target device to be controlled in the case that a device control message is transferred via a virtual server control system.

It is yet another object of the present invention to provide an apparatus for controlling at least one controlled device in a control device, by setting a target device of the at least one controlled device in the control device.

To accomplish the above object of the present invention, according to one aspect of the present invention, there is provided a method of controlling at least one controlled device in a control device, the method comprising the steps of: loading a web browser screen by driving a web browser module providing a user interface; transferring a message including a controlled device identifier part and a control information identifier part to a web server module providing control information with respect to the at least one controlled device; and setting a target of the at least one controlled device based on the controlled device identifier part of the message and identifying the control information based on the control information identifier part, to thereby provide the web server module with control information with respect to the set target device and the identified controlled device.

According to another aspect of the present invention, there is also provided a method of controlling at least one controlled device in a control device, including a browser module capable of supporting predetermined first and second device control systems and providing a user interface, a server module capable of providing and indicating control information with respect to the at least one controlled device, and a basic control module capable of performing a device control by using the second device control system, in which the device control with respect to the at least one controlled device is performed according to the steps of transferring a predetermined message from the browser module to the server module, providing and indicating the control information from the server module to the browser module in correspondence to the message, and performing the device control with respect to the at least one controlled device according to the second device control system by the basic control module in correspondence to a user input on the control information indicated on the browser module, the method comprising the steps of: providing the predetermined message transferred from the browser module to the server module, the message including a device identifier part and a control information identifier part; and setting a target device for device control according to the second device control system based on the device identifier part and identifying the control information based on the control information identifier part, in the server module, to thereby transfer the identified control information to the browser module.

According to still another aspect of the present invention, there is also provided an apparatus for controlling at least one controlled device in a control device, including a browser module capable of supporting predetermined first and second device control systems and providing a user interface, a server module capable of providing and indicating control information with respect to the at least one controlled device, and a basic control module capable of performing a device control by using the second device control system, in which the device control with respect to the at least one controlled device is performed according to the steps of transferring a predetermined message from the browser module to the server module, providing and indicating the control information from the server module to the browser module in correspondence to the message, and performing the device control with respect to the at least one controlled device according to the second device control system by the basic control module in correspondence to a user input on the control information indicated on the browser module, the apparatus comprising: the browser module providing the predetermined message including a device identifier part and a control information identifier part to the server module; and the server module setting a target device for device control according to the second device control system based on the device identifier part and identifying the control information based on the control information identifier part, in the server module, to thereby transfer the identified control information to the browser module.

Preferably, the method of controlling the at least one controlled device in the control device, adopts a virtual server control system that is incorporated and applied with the EIA-775.1 standard in which the control device comprises both the web browser module and the web server module.

Preferably, the control device and the controlled device are mutually connected via an IEEE 1394 bus.

Preferably, the web server module performs an operation of transferring a previously possessed file to the web browser according to a request of the web browser, which is called a predetermined file server operation, and an operation of simply transferring a file according to a request of the web browser, which is called a CGI (Common Gateway Interface).

Preferably, the device control system makes a code in a manner that an image determined in a standard with respect to a corresponding portion is included in the case that the controlled device supports a client/server control system such as a home wide web, but makes a code in a manner that an internally prepared image is included after judging the kind of a device according to a command control system in the case that the controlled device does not support the client/server control system but supports the command control system such as an AV/C.

Preferably, the control device parses and transforms the message via the web server module and outputs the message to the controlled device via a command module, according to the control command selected via the web browser module by the user.

Preferably, the server module provides an array of device identifiers with respect to the devices connected to the server module, and the device identifier part is an index with respect to the array of the device identifiers.

Preferably, the device identifier part is a node identifier defined in an IEEE 1394 high performance serial bus technology.

Preferably, the message comprises a first block for CGI control, a second block indicating as an index whether a GUID (Global Unique Identifier) of the target device to be controlled corresponds to any one of a predetermined GUID array, and a third block indicating a name of a device control page necessary for controlling the target device.

Preferably, the GUID of the target device to be controlled is directly indicated in the second block.

Preferably, the control device is one of a personal computer, a digital TV, a digital set-top-box, and a web TV.

Preferably, the web server produces a device control page code without having a message request of the web browser and transfers the produced device control page code.

BRIEF DESCRIPTION OF THE DRAWINGS

The above objects and other advantages of the present invention will become more apparent by describing the preferred embodiment thereof in more detail with reference to the accompanying drawings in which.

DESCRIPTION OF THE PREFERRED EMBODIMENTS

A method of controlling at least one controlled device in a control device according to a preferred embodiment of the present invention will be described in more detail with reference to the accompanying drawings. Here, referring to FIGS. 6 through 9, a device control scenario is described in a home network where the present invention is applied to a digital TV 10 being a control device and a digital VHS 20 being a controlled device.

Figure 6:
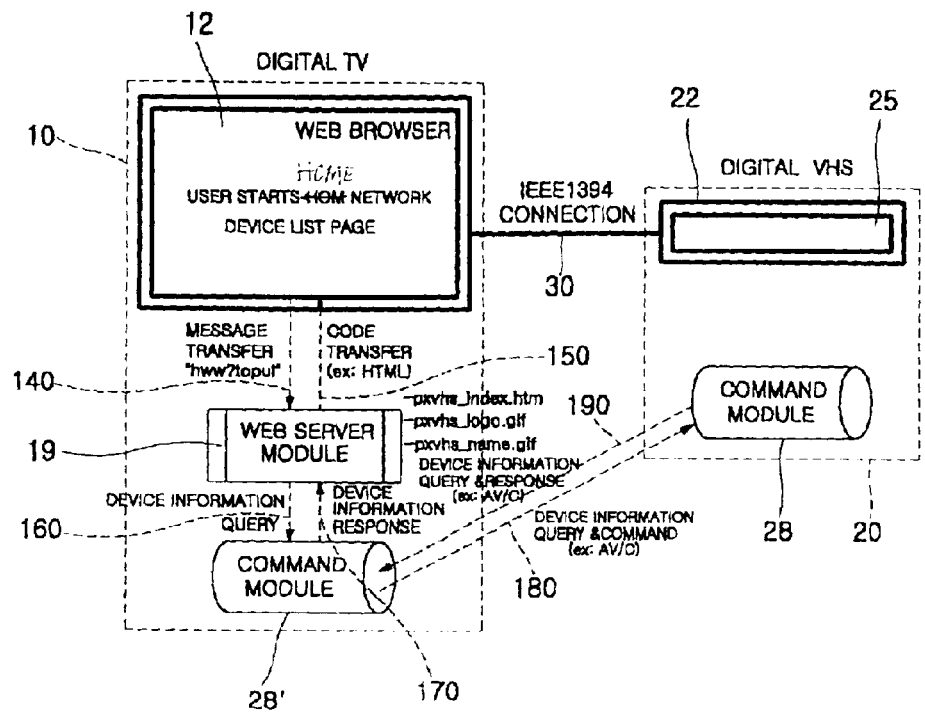
FIGS. 6 through 9 illustrate a method of controlling at least one controlled device in a control device, in which a digital VHS being a controlled device is controlled by a digital TV, according to a preferred embodiment of the present invention.

FIG. 6 illustrates a step of loading a home network device list page or a top-level user interface by a user, which is a first step of a home network device control scenario on the digital TV 10. The user loads the home network device list page on the web browser using a remote controller of the digital TV 10 typically, which is done by loading a URL (Uniform Resource Locator) representing the home network device list page on the web browser. In this specification, it is assumed that http://127.0.0.1/hww?topU1 has been used as an example of the device list page. Here, the first "http" means the name of a protocol used for transferring a message. The second "127.0.0.1" is specially designated as a device internal web server. The last "hww?topU1" means a message to be sent with respect to the internal web server module 19. That is, when the user manipulates the remote controller to intend to load the home network device list page, a message such as the "hww?topU1" is transferred from the web browser 12 to the internal web server module 19 as depicted as a dotted arrow 140.

If the web server module 19 has received the message, it produces a predetermined code, e.g., an HTML code in order to represent a list of the devices connected to the current home network on the web browser 12 and outputs the produced result to the web browser 12 as depicted as a dotted arrow 150. That is, a region is set where the devices connected to the current home network will be indicated on the web browser. In the case that one of the devices supports a client/server control system such as a home wide web, a code is made so that images such as the logo.gif and name.gif files determined in the standard are included for a corresponding region. Conversely, in the case that the device does not support the client/server control system, the kind of the device is judged according to the command control system (as depicted as dotted arrows 160, 180, 190 and 170 in sequence. Thereafter, a code is made so that the internally prepared images, e.g., the pxvhs_logo.gif and pxvhs_name.gif files in the case of the digital VHS 20 are included. Also, a device control page for each device is linked with each logo image. If the device supports the client/server control system, an "index.htm" file determined in the client/server control standard is linked with the above-described logo image "logo.gif" as in the following program.

```
<A hreg=http://10.0.0.1/index.htm>
<IMG src="logo.gif">
</A>
```

Conversely, in the case that the device does not support the client/server control system but the AV/C command control system, a pxvhs_index.htm" being a control information identifier part is linked with the logo image "pxvhs_logo.gif" as in the following program.

```
<A href="hww?guidindex=2?pxvhs_index.htm">
<IMG src="pxvhs_logo.gif">
</A>
```

Figure 7:
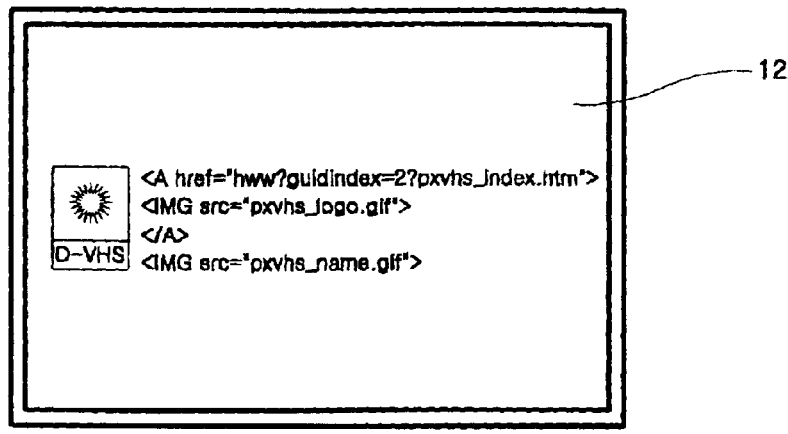

FIG. 7 illustrates a portion with respect to the digital VHS 20, in the home network device list page formed in the above manner. One thing that is noted among the linked messages is a portion such as the "hww?guidindex=2?" that will be described in more detail after describing the device control scenario with reference to FIGS. 8 and 9.

Figure 8:
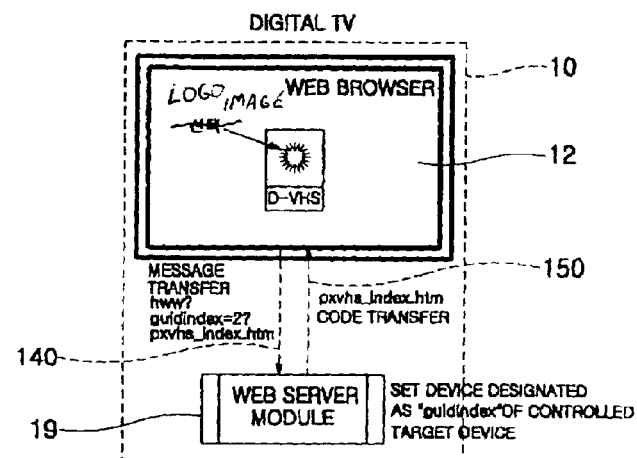

If a user selects or clicks a logo image of the digital VHS 20 by using the remote controller of the digital TV 10 at the state when the logo image has been produced on the home network device list page as shown in FIG. 7, a file "hww?guidindex=2?pxvhs_index.htm" being a message linked with the "pxvhs_logo.gif" image is transferred to the internal web server module 19 of the digital TV 10 as shown in FIG. 8, as depicted as a dotted arrow 140. The web server module 19 parses the message and grasps that a device to be controlled by the user is a device designated as the "guidindex=2" file and the "pxvhs_index.htm" file should be sent to the web server module 19 in order to control the device. Then, the "pxvhs_index.htm" file prepared in advance in the web server module is sent to the web browser 12, or the "pxvhs_index.htm" file is produced dynamically from the current state to then transfer it to the web browser as depicted as a dotted arrow 150.

Figure 9:
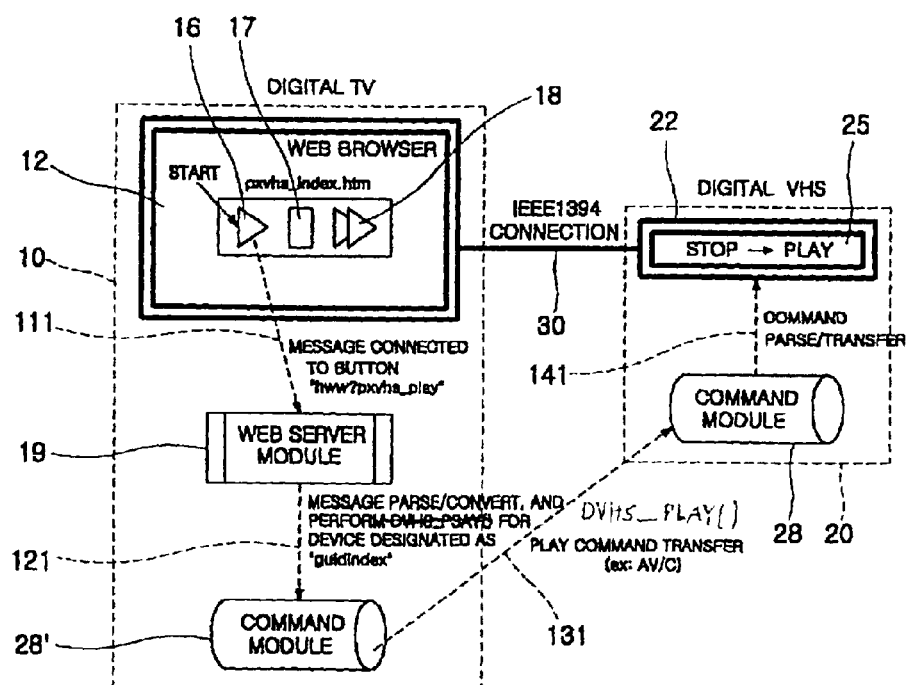

FIG. 9 illustrates the state where the "pxvhs_index.htm" file of the device control page for the digital VHS 20 has been loaded on the web browser 12 of the digital TV 10 through the above procedure. For convenience of explanation, it is assumed that the current digital VHS 20 is in a STOP state and a user intends to insert a tape cassette into the digital VHS 20 and play it. A current function of the digital VHS 20 to be driven by a user is a play function. Thus, if the user locates a pointer in a region corresponding to a PLAY 16 on the web browser 12 and depresses a SELECT button (not shown), a message linked with the region, e.g., the "hww?pxvhs_play" file is transferred to the web server module 19 as depicted as a dotted arrow 111. The web server module 19 parses and transforms a function corresponding to the "pxvhs_play" message with respect to the device set as a control target device, i.e., a digital VHS, via the "guidindex=2" and the DVHS Play( ) is executed with respect to the device designated as the guidindex as depicted as a dotted arrow 121, to thereby drive the digital VHS 20 using a command supported by the digital VHS 20, that is, an AV/C command, as depicted as a dotted arrow 131. The digital VHS 20 receives the command and performs a device shift operation in correspondence to the command as depicted as a dotted arrow 141, that is, from a STOP mode to a PLAY mode.

The "hww?guidindex=2?" file will now be described. In a control system to which the present invention is applied, an operation performed by the web server module 19 is largely divided into two blocks. One is an operation of transferring an already-contained file to the web browser 12 according to a request, which is called a predetermined file server operation, and the other is an operation of performing a predetermined action in addition to an action of simply transferring a file according to a request from the web browser with a CGI (Common Gateway Interface). For example, a message such as the "pxvhs_logo.gif" from the web browser, which plays a role of transferring an internally contained file simply, corresponds to a scope of the first operation. A message such as the "hww?topU1" from the web browser plays a role of checking various items with respect to each device connected to the current home network and performing a predetermined action according to a checked result and corresponds to a scope of the second operation.

Figure 1:
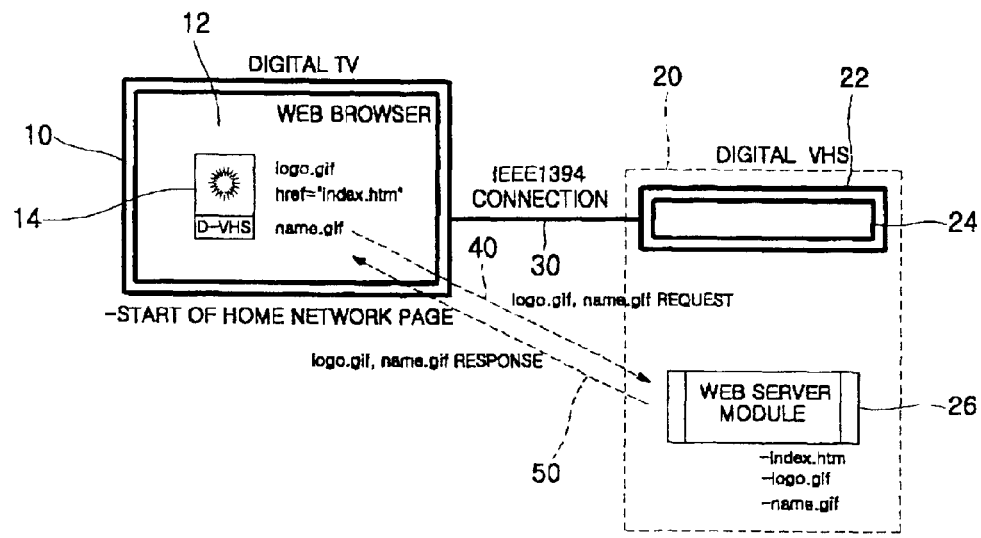
FIGS. 1 and 2 illustrate a process for controlling a digital VHS on a digital TV according to a conventional home wide web (HWW) control system in a home network system constructed by connecting the digital TV and the digital VHS via an IEEE 1394 bus.
Figure 2:
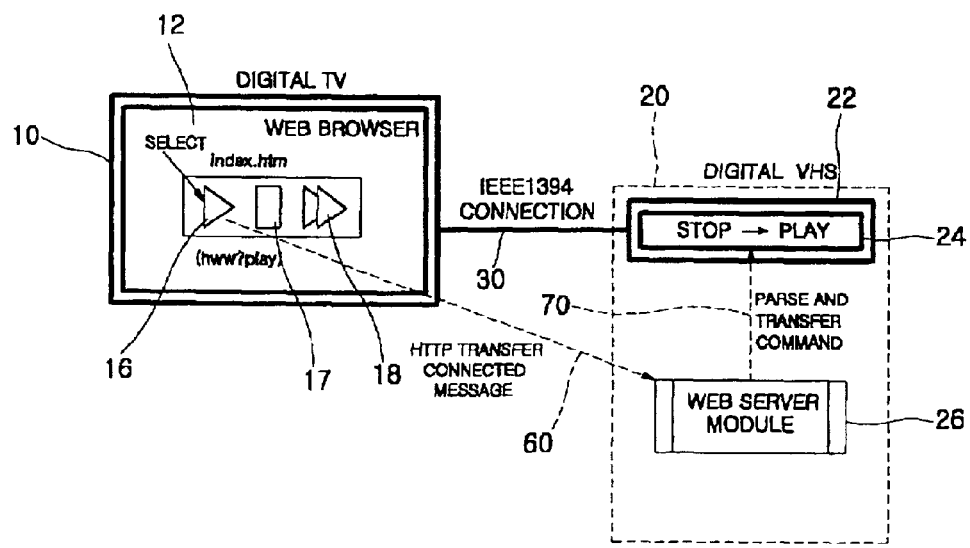
Figure 3:
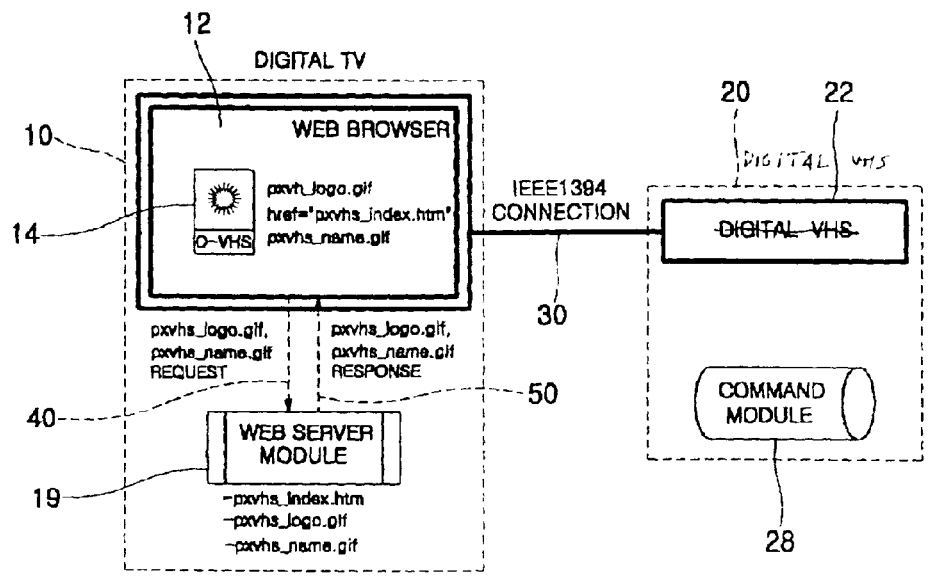
FIGS. 3 through 5 illustrate a process for controlling a digital VHS being a controlled device in a digital TV being a control device via a virtual server control system.
Figure 4:
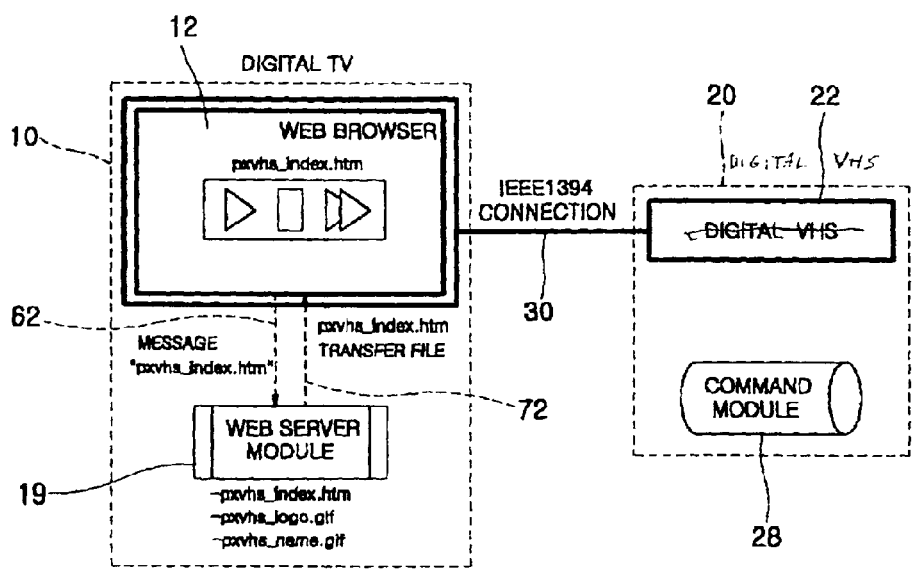
Figure 5:
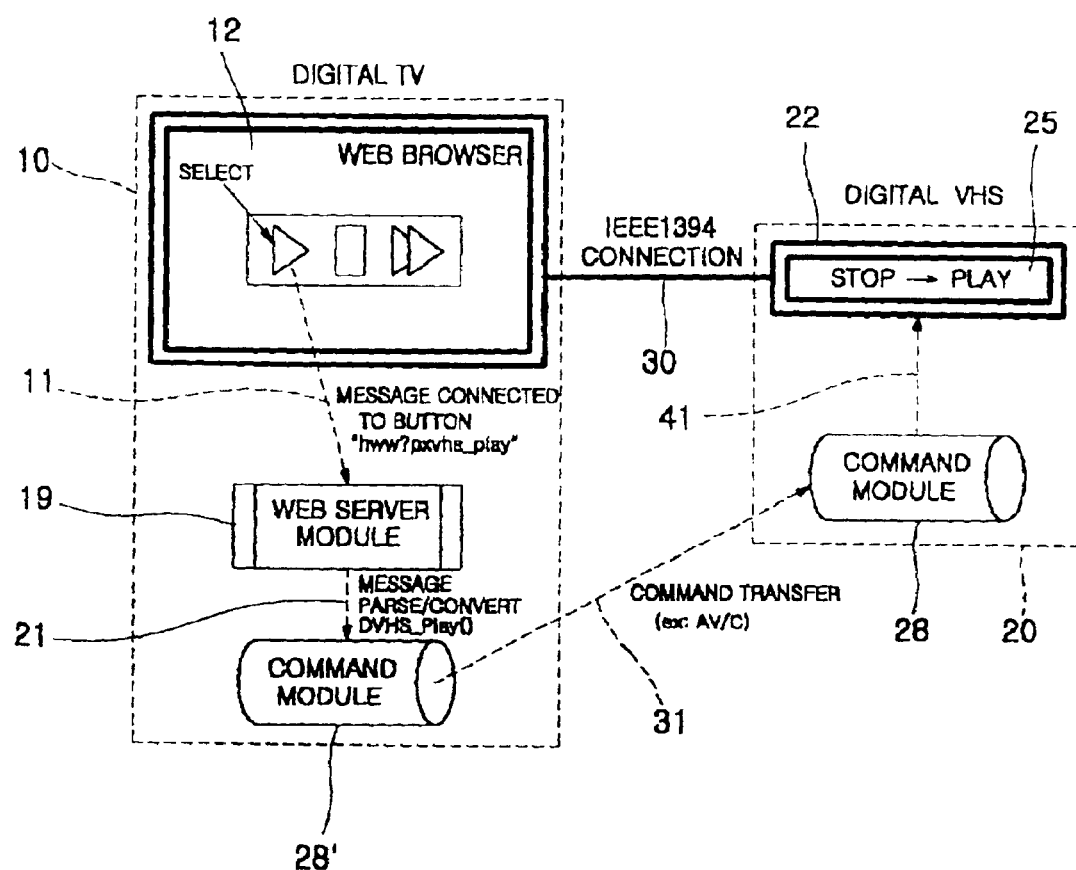

In the client/server control system described with reference to FIGS. 1 and 2, and the prior art virtual server control system described with reference to FIGS. 3 through 5, the first operation of the web server is used to perform a loading operation, when the device control pages such as index.htm and pxvha_index.htm are linked with the logo image. That is, since the device control page is linked with <A href="index.htm"></A> or <A href="pxvhs_index.htm">, no information is left in the device control program module of the web server when the device control page is loaded. Thus, in the case that a message of the "hww?pxvhs_play" being the device control command is transferred, it is difficult to determine which device is adopted as a control target device. For example, in the case that the transferred control message is the "hww?pxvhs_play" and there is only one digital VHS connected to the current network, the digital VHS is adopted as a target device, to perform a device control. However, it is preferable that a more general control target device is set.

It can be seen that a message is made up of three blocks from the "hww?guidindex=2?pxvhs_index.htm" being a message shown in FIG. 7. The "hww" in the first block represents that the message is formed for a CGI control. The "?guidindex=2" in the second block represents that a GUID (Global Unique Identifier) of the target device to be controlled corresponds to a GuidList{2} among a predetermined GUID array, e.g., GuidList{ }. The "?pxvhs_index.htm" in the third block represents that the name of the device control page necessary for controlling the target device is the "pxvhs_index.htm". Among them, the second block will be described. Four devices such as a digital VHS-1, a digital VHS-2, a DVD and a digital set-top-box are connected to the home network via the virtual server control system. A digital VHS logo-1, a digital VHS logo-2, a DVD logo, and a digital set-top-box logo are indicated on the home network device list page, in addition to the digital TV. Accordingly, whether or not a user controls a certain device is determined according to whether the user selects a logo image of one of the devices on the home network device list page.

Thus, when the logo image has been selected, information with respect to the device selection is loaded and inserted into the message transferred to the internal web server in reply to the selected logo image. Therefore, it is possible for the internal web server to set a target device to be controlled based on the information. As an example of the device selection, the web server module 19 makes up a GUID array of the devices connected to the current network in the name of a GUID LIST [ ] at the time when the home network device list page is produced, and then the index of the GUID LIST is transferred to the second block, as shown in FIGS. 7 and 8. Besides, the GUID of the controlled target device can be indicated in the second block, and a node ID used in the IEEE 1394 technology is contained in the message and then the node ID contained message can be transferred. However, in the case that the node ID is used, the home network device list page should be updated if an allocation of the node ID is changed on the network as in the bus reset of the IEEE 1394. As described above, in the case that the message, such as the "hww?pxvhs_play" being the device control command, is transferred to the web server module 19 after the target device being a controlled object is set from the information included in the second block of the message, a proper command such as the AV/C is transferred with respect to the previously set target device.

As described above, a controlled target device setting method in the method for controlling at least one controlled device by a control device has been described based on the preferred embodiment of the present invention. As the most preferable and typical embodiment of the present invention has been described in the specification, a technical scope of the patent right obtained from the concept and spirit of present invention is not limited thereto. For example, the present invention can be applied to an embedded system such as a digital TV, a digital set-top-box and a web TV as well as a device of a typical client/server model such as a personal computer. Since a specially designed embedded web browser and an embedded web server are installed in the case of the embedded system, a slightly modified client/server model can be realized internally according to a designer intention. Thus, it is not proper that the present invention is limited to the typical embodiment thereof. As an example of modifying the client/server model, an embedded system designer can construct a web server to respond without having a request of the web browser, although the previous description is a typical client/server model in which a web server provides a response in reply to a request of a web browser, only if the web browser sends the request to the web server. For example, in the case that a home network device list page is produced, a system can be constructed so that a web server produces a page code at random without having a request of a web browser according to a particular key stroke of a user, and transfers the produced page code, and the web browser receives the transferred page code to be displayed on the web browser screen. These differences are within the essence of the present invention.

The description with respect to the other portions in the specification is nothing but a typical example of the present invention. The technical scope of the patent right obtained from the concept and spirit of the present invention is not limited to the detailed description thereof, but understood and defined only by the appended claims to be described later.

In the present invention, in the case that a device control message is transferred via the above-described virtual server control system, a target device to be controlled can be properly set. Accordingly, the virtual server control system is applied in the more complicated home network, to thereby provide an effect that a device control system of a controlled device can be adaptively applied to a client/server control system and a command control system such as an AV/C.

What is claimed is:

1. A method of controlling at least one controlled device by a control device, said control device including:
 a browser module configured to support predetermined first and second device control systems, said first device control system being a server control system, said second device control system being a command control system, and said browser module including a user interface,
 a server module configured to provide and indicate control information with respect to the at least one controlled device, and
 a basic control module configured to perform a device control with respect to the at least one controlled device;

the method comprising the steps of:
 transferring a predetermined message from the browser module to the server module based on a selection of a user; setting a target device of the at least one controlled device for device control based on a device identifier part;
 providing and indicating control information by the server module based on a control information identifier part;
 transferring identified control information from the server module to the browser module; and
 performing the device control of said target device based on said control information;
 wherein when said target device is not supported by said first device control system, said predetermined message corresponds to the target device and is prepared in advance by said control device according to said second device control system, said predetermined message including a device identifier part and a control information identifier part.

2. The method of claim 1, further comprising adopting a virtual server control system that is incorporated and applied with the EIA-775.1 standard in which the control device comprises both the web browser module and the web server module.

3. The method of claim 1, wherein the control device and the controlled device are mutually connected via an IEEE 1394 bus.

4. The method of claim 1, wherein the server module performs an operation of transferring a previously possessed file to the web browser according to a request of the web browser, and an operation of simply transferring a file according to a request of the web browser.

5. The method of claim 4, wherein the operation of transferring a previously possessed file to the web browser according to a request of the web browser is a predetermined file server operation.

6. The method of claim 4, wherein the operation of simply transferring a file according to a request of the web browser is performed through a Common Gateway Interface (CGI).

7. The method of claim 1, wherein the device control system makes a code in a manner that an image determined in a standard with respect to a corresponding portion is included if the controlled device supports said first device control system, said first device control system being a home wide web, but makes a code in a manner that an internally prepared image is included after judging the kind of a device according to a command control system if the controlled device does not support the first device control system but supports the command control system.

8. The method of claim 7, wherein the command control system is an audio/video command control system.

9. The method of claim 4, wherein the control device parses and transforms the predetermined message via the web server module and outputs the predetermined message to the controlled device via a command module, according to the control command selected via the web browser module by the user.

10. The method of claim 1, wherein the server module provides an array of device identifiers with respect to devices connected to the server module, and the device identifier part is an index with respect to the array of device identifiers.

11. The method of claim 1, wherein the device identifier part is a node identifier defined in an IEEE 1394 high performance serial bus technology.

12. The method of claim 1, wherein the message comprises a first block for Common Gateway Interface (GGI) control, a second block indicating as an index whether a Global Unique Identifier (GUID) of the target device to be controlled corresponds to any one of a predetermined GUID array, and a third block indicating a name of a device control page necessary for controlling the target device.

13. The method of claim 12, wherein the GUID of the target device to be controlled is directly indicated in the second block.

14. The method of claim 13, wherein the control device is one of a personal computer, a digital TV, a digital set-top-box, and a web TV.

15. The method of claim 14, wherein the web server produces a device control page code without having a message request of the web browser and transfers the produced device control page code.

16. A method of controlling at least one controlled device by a control device, the method comprising the steps of
 loading a web browser screen by driving a web browser module providing a user interface;
 transferring a message including a controlled device identifier part and a control information identifier part to a web server module;
 setting a target device of the at least one controlled device, wherein when said target device is not supported by a server control system, said message corresponds to the target device and is prepared in advance by said control device according to a command control system, said message including a device identifier part and a control information identifier part, said setting of said target device being based on the controlled device identifier part of the message;

identifying the control information based on the control information identifier part; and providing the web server module with control information with respect to the set target device.

17. The method of claim 16, further comprising adopting a virtual server control system that is incorporated and applied with the EIA-775.1 standard in which the control device comprises both the web browser module and the web server module.

18. The method of claim 16, wherein the control device and the controlled device are mutually connected via an IEEE 1394 bus.

19. The method of claim 16, wherein the web server module performs an operation of transferring a previously possessed file to the web browser according to a request of the web browser, and an operation of simply transferring a file according to a request of the web browser.

20. The method of claim 19, wherein the operation of transferring a previously possessed file to the web browser according to a request of the web browser is a predetermined file server operation.

21. The method of claim 19, wherein the operation of simply transferring a file according to a request of the web browser is performed through a Common Gateway Interface (CGI).

22. The method of claim 19, wherein the device control system makes a code in a manner that an image determined in a standard with respect to a corresponding portion is included if the controlled device supports the server control system such as a home wide web, but makes a code in a manner that an internally prepared image is included after judging the kind of a device according to a command control system if the controlled device does not support the server control system but supports the command control system.

23. The method of claim 22, wherein the command control system is an audio/video command control system.

24. The method of claim 19, wherein the control device parses and transforms the message via the web server module and outputs the message to the controlled device via a command module, according to the control command selected via the web browser module by the user.

25. The method of claim 24, wherein the server module provides an array of device identifiers with respect to devices connected to the server module, and the device identifier part is an index with respect to the array of device identifiers.

26. The method of claim 25, wherein the device identifier part is a node identifier defined in an IEEE 1394 high performance serial bus technology.

27. The method of claim 16, wherein the message comprises a first block for CGI control, a second block indicating as an index whether a GUID (Global Unique Identifier) of the target device to be controlled corresponds to any one of a predetermined GUID array, and a third block indicating a name of a device control page necessary for controlling the target device.

28. The method of claim 27, wherein the GUID of the target device to be controlled is directly indicated in the second block.

29. The method of claim 28, wherein the control device is one of a personal computer, a digital TV, a digital set-top-box, and a web TV.

30. The method of claim 29, wherein the web server produces a device control page code without having a message request of the web browser and transfers the produced device control page code.

31. An apparatus for controlling at least one controlled device by a control device, said control device comprising:

a browser module configured to support predetermined first and second device control systems, said first device control system being a server control system, said second device control system being a command control system, said browser control module including a user interface;

a server module configured to provide and indicate control information with respect to the at least one controlled device; and a basic control module configured to perform a device control with respect to the at least one controlled device by using the second device control system;

wherein said control device sets a target device of the at least one controlled device;

wherein when said target device is not supported by said first device control system, a predetermined message corresponding to the target device is prepared in advance by said control device according to said second device control system, said predetermined message including a device identifier part and a control information identifier part, wherein said predetermined message is transferred from the browser module to the server module based on a selection of a user;

wherein said target device is set based on the device identifier part, and control information is provided and indicated by said server module based on the control information identifier part;

wherein control information is transferred from the server module to the browser module; and wherein device control of the target device is performed in correspondence with the control information.

* * * * *